(12) United States Patent
Kallenberger et al.

(10) Patent No.: US 6,880,874 B1
(45) Date of Patent: Apr. 19, 2005

(54) STORAGE RECEPTACLE FOR USE IN AUTOMOTIVE DOOR LINING

(75) Inventors: Kris Kallenberger, Dublin, OH (US); Marc Palmer, Plain City, OH (US); Don Jackson, West Mansfield, OH (US); Ichiro Sasaki, Dublin, OH (US)

(73) Assignee: Honda Motor Co., Tokyo (JP)

( * ) Notice: Subject to any disclaimer, the term of this patent is extended or adjusted under 35 U.S.C. 154(b) by 0 days.

(21) Appl. No.: 10/698,544

(22) Filed: Oct. 31, 2003

(51) Int. Cl.⁷ .................................................. B60R 7/04
(52) U.S. Cl. .................. 296/37.13; 296/37.1; 296/37.8
(58) Field of Search ............................. 296/37.1, 37.8, 296/37.9, 37.11, 37.13, 37.16, 152, 153; 224/539, 542, 547; 248/314

(56) References Cited

U.S. PATENT DOCUMENTS

| | | | |
|---|---|---|---|
| 1,649,435 A | * 11/1927 | Wood et al. | ............... 296/37.9 |
| 4,283,083 A | 8/1981 | Johnson | |
| 4,453,760 A | 6/1984 | Hira | |
| 4,619,477 A | 10/1986 | Kneib et al. | |
| 5,118,017 A | 6/1992 | Buck | |
| 5,379,787 A | * 1/1995 | Haines | ...................... 296/37.9 |
| 5,429,285 A | 7/1995 | Kim | |
| 5,499,853 A | * 3/1996 | Pourian | ..................... 296/37.13 |
| 5,535,571 A | * 7/1996 | Nichols | ..................... 296/37.13 |
| 5,598,854 A | * 2/1997 | Gillie | ......................... 296/37.9 |
| 5,733,060 A | 3/1998 | Choquet | |
| 6,026,999 A | 2/2000 | Wakefield | |
| 6,116,672 A | 9/2000 | Cannon et al. | |
| 6,467,829 B1 | 10/2002 | Kaluszka et al. | |
| 2001/0052715 A1 | * 12/2001 | McAndrew et al. | ..... 296/37.13 |

* cited by examiner

*Primary Examiner*—Lori L. Coletta
(74) *Attorney, Agent, or Firm*—Carrier, Blackman & Associates, P.C.; William D. Blackman; Joseph P. Carrier

(57) ABSTRACT

A storage receptacle is usable in a map pocket without requiring an intermediate adapter ring. The storage receptacle only uses part of the storage space within the map pocket, and leaves the rest of the space available for maps or other personal items. The receptacle may be dimensioned to use less than half the space of the vehicle door pocket. In a selected illustrative embodiment, a storage receptacle is adapted to receive and store glasses therein, such as eyeglasses or sunglasses. The storage receptacle includes a receptacle case made from a strong plastic material, and may also include a liner made from a material such as foam padding, cloth, and/or flocking provided on an inner wall of the receptacle case, to protect glasses which may be stored therein.

19 Claims, 7 Drawing Sheets

STORAGE RECEPTACLE FOR USE IN AUTOMOTIVE DOOR LINING

BACKGROUND OF THE INVENTION

1. Field of the Invention

The present invention relates to vehicular storage receptacles. More particularly, the present invention relates to a storage receptacle for subdividing a pocket in a vehicle door.

2. Description of the Background Art

Most vehicles today have pockets disposed in the lining of the door, for storage of personal items such as maps, recorded music, umbrellas, trash, and other user-selected items. However, when storing small items in these conventional pockets, it is very difficult to locate a small item in a large pocket, especially while driving.

When storing something relatively small such as sunglasses or eyeglasses, there is no need for a large space-consuming storage receptacle. Conventionally, sunglasses and eyeglasses have been stored in compartments within the roof console, the center console or the glove box.

However, when stored in these conventional locations, the glasses may be scratched or damaged from contact with other items placed within the sane area. When glasses are stored in a roof console, and a vehicle is left in the sun with the windows up, the glasses may become too hot for the user to immediately wear after they are removed from storage. Under extreme conditions, sunglasses may melt or warp if exposed to excessive heat.

A number of different storage devices are known for use in automotive doors. Examples of some of the known storage devices include those described in U.S. Pat. Nos. 4,453,760, 4,619,477, 5,733,060, and 6,116,672.

U.S. Pat. No. 6,116,672, issued in 2000 to Cannon et al. discloses an insert for placement in the map pocket of a vehicle door. In one embodiment, the insert of Cannon is a comparatively large device which fills substantially all of the space within the map pocket, and which has at least one partition formed therein, to subdivide the space into multiple compartments. In another embodiment of an insert according to Cannon'672, an adapter ring is provided for placement in the top of the door pocket, and various configured storage bins may be selected for placement in a standardized opening formed in the adapter ring.

Although the known storage devices have some utility for their intended purposes, a need still exists in the art for a storage receptacle which is usable to conveniently subdivide a vehicle door pocket, and which is configured to conveniently store glasses therein. A need also exists for a storage receptacle which only uses part of the storage space within the map pocket, and which leaves the rest of the space therein available for maps or other personal items.

SUMMARY OF THE INVENTION

The present invention provides an improved storage receptacle which is usable in a map pocket without requiring an intermediate adapter ring. The storage receptacle hereof only uses part of the storage space within the map pocket, and leaves the rest of the space available for maps or other personal items. The receptacle may be dimensioned to use less than half the space of the vehicle door pocket.

The storage receptacle hereof is sized and configured to conveniently store glasses such as sunglasses or prescription eyeglasses therein, and may include a soft liner therein to protect delicate surfaces of the glasses. Where used, the liner may include a material such as foam padding, fiber batting, cloth, and/or flocking.

The storage receptacle hereof is provided for use with a pocket on a vehicle door, and includes a receptacle case having at least one side wall, and a floor formed integrally with the side wall and cooperating therewith to define a storage space within the receptacle.

The receptacle case also includes a lip extending substantially horizontally outwardly from a top portion of the side wall. The lip is provided for placement over an upper edge portion of the vehicle door pocket. Optionally, the receptacle case may include a dependent flange integrally formed with and extending downwardly from the lip.

It is a notable feature of the invention that in this first embodiment, the side wall has a gap formed therein, extending downwardly from said top portion thereof. The gap may extend from the top portion of the side wall down to the floor. Due to the presence of the gap, when the receptacle is installed in a door pocket of a vehicle, a vertical wall of the vehicle door pocket cooperates with the receptacle to define an edge portion of the storage space therein.

Optionally, the storage receptacle may include a partition for placement in the receptacle case to subdivide the storage space.

The receptacle case may be configured to taper inwardly from the top towards the bottom thereof. In one embodiment, the top edge of the receptacle case may ramp downwardly on one side thereof, to ensure that the space defined therein will be protectively disposed within the door pocket, below an upper edge thereof.

In another embodiment of the invention, the receptacle case is substantially box-shaped, and includes four integrally attached side wall portions. In this box-shaped embodiment, a first side wall portion is provided for placement at the vehicle front end of the door pocket with a second side wall portion attached to the first side wall portion and extending substantially transverse thereto. A third side wall portion is attached to the second side wall portion and extends substantially transverse thereto, parallel to the first side wall portion. A fourth side wall portion is attached to the third side wall portion and extends substantially transverse thereto, in a direction towards the first side wall portion, and with the gap formed between the first and fourth side wall portions.

Optionally, the fourth side wall portion may be spaced inwardly in relation to the back edge of the first side wall portion.

In another embodiment hereof, the receptacle case includes two integrally attached side wall portions. A first side wall portion is substantially flat and has a gap formed therein, and a second side wall portion is semi-cylindrical in shape, so that the case has an outline shape resembling a half-moon.

Accordingly, it is an object of the present invention to provide a storage receptacle apparatus for use in conjunction with a pocket of an automotive door liner. It is another object of the present invention to provide a storage apparatus which is configured and sized to receive and protectively store a pair of glasses therein.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Referring now to FIGS. 1–4 of the drawings, a door panel DP, for a vehicle door, is provided with a door pocket 10 formed therein. The door pocket 10 may also be described as a map pocket.

Figure 5:
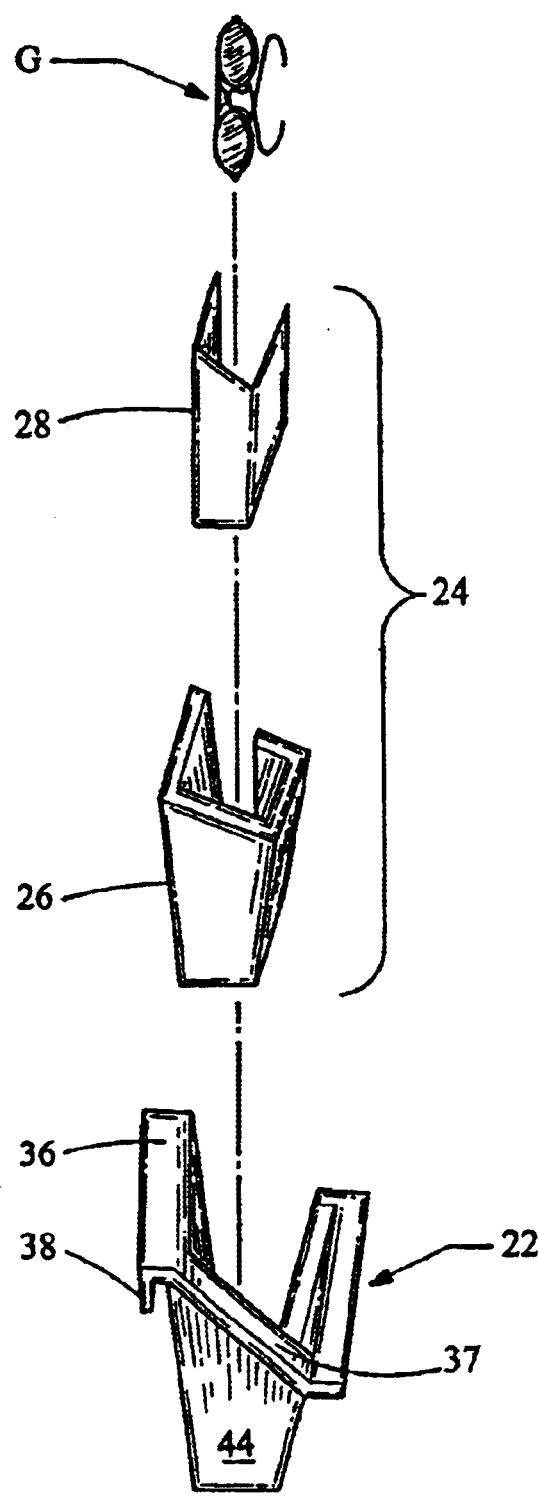
FIG. 5 is an exploded perspective view of the storage receptacle of FIGS. 3–4.

A storage receptacle 20 according to a first embodiment of the invention is shown inside of the storage area 18 of the map pocket, to divide the storage area and to reserve a portion thereof for storing particular items, such as glasses G (FIG. 5).

The storage receptacle 20 is made up primarily of a rigid receptacle case 22, but may also include an optional liner 24 (FIG. 5), for placement inside of the receptacle case.

Figure 1:
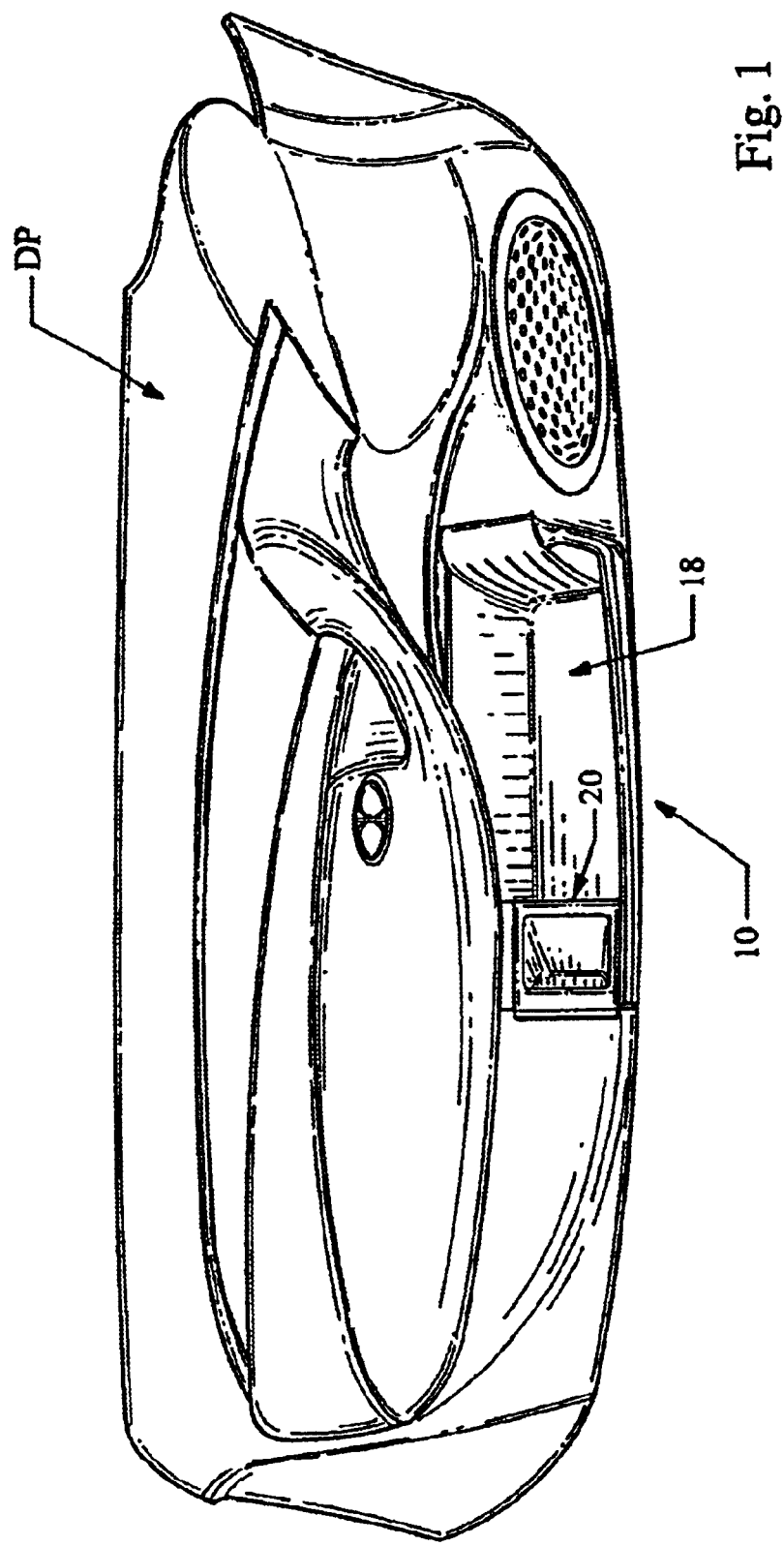
FIG. 1 is an environmental perspective view of a vehicle door panel, showing a door pocket therein and a storage receptacle according to a first embodiment of the present invention installed in the door pocket.
Figure 2:
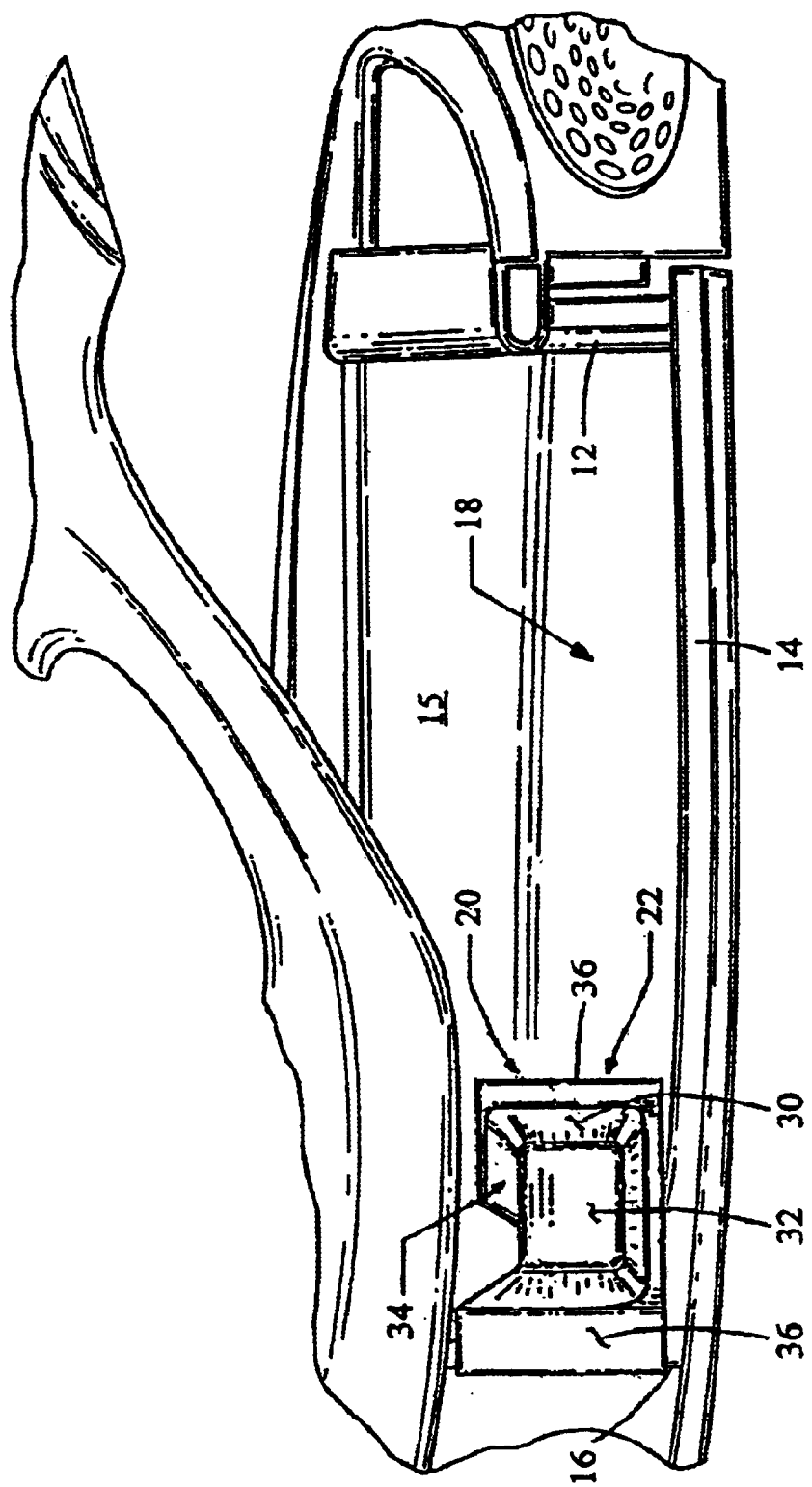
FIG. 2 is a perspective view similar to FIG. 1, but from a closer vantage point above the receptacle.

As seen best in FIG. 2, in the depicted embodiment, the door pocket 10 includes a front wall portion 12, an inboard longitudinal side wall portion 14, an outboard longitudinal side wall portion 15, formed by part of the door panel DP, and a rear wall portion 16. The door pocket 10 has a hollow storage area 18 defined therein, to allow a user of the vehicle to store maps or personal items therein.

The storage receptacle 20 is provided for use with a pocket 10 on a vehicle door, and includes a receptacle case 22 having at least one side wall 30 (FIG. 2), and a floor 32 formed integrally with the side wall 30 and cooperating therewith to define a storage space 34 within the receptacle.

The receptacle case 22 may also include a lip 36 extending substantially horizontally outwardly from a top portion of the side wall 30. The lip 36, where used, is provided for placement over an upper edge portion of the vehicle door pocket 10. Optionally, the receptacle case 22 may include a dependent flange 38 (FIG. 3) integrally formed with and extending downwardly from the lip 36.

It is a notable feature of the invention that in this first embodiment, a portion of the side wall 30 has a gap 40 formed therein, extending downwardly from the top portion thereof. The gap may extend from the top portion of the side wall 30 down to the floor 32. Due to the presence of the gap 40, when the receptacle 20 is installed in a door pocket 10 of a vehicle, a vertical wall 15 of the vehicle door pocket cooperates with the receptacle to define an edge portion of the storage space 34 therein.

In the embodiment of the invention shown in FIGS. 1–5, the receptacle case 22 is substantially box-shaped, and includes four integrally attached side wall portions 42, 44, 46, and 48. A first (front) side wall portion 42 is provided for placement at the vehicle front end of the door pocket DP. A second (inboard) side wall portion 44 is integrally attached to the first side wall portion 42 and extends substantially transverse thereto. A third (rear) side wall portion 46 is integrally attached to the second side wall portion 44 and extends substantially transverse thereto and parallel to the first side wall portion 42. A fourth (outboard) side wall portion 48 is attached to the third side wall portion and extends substantially transverse thereto.

Figure 3:
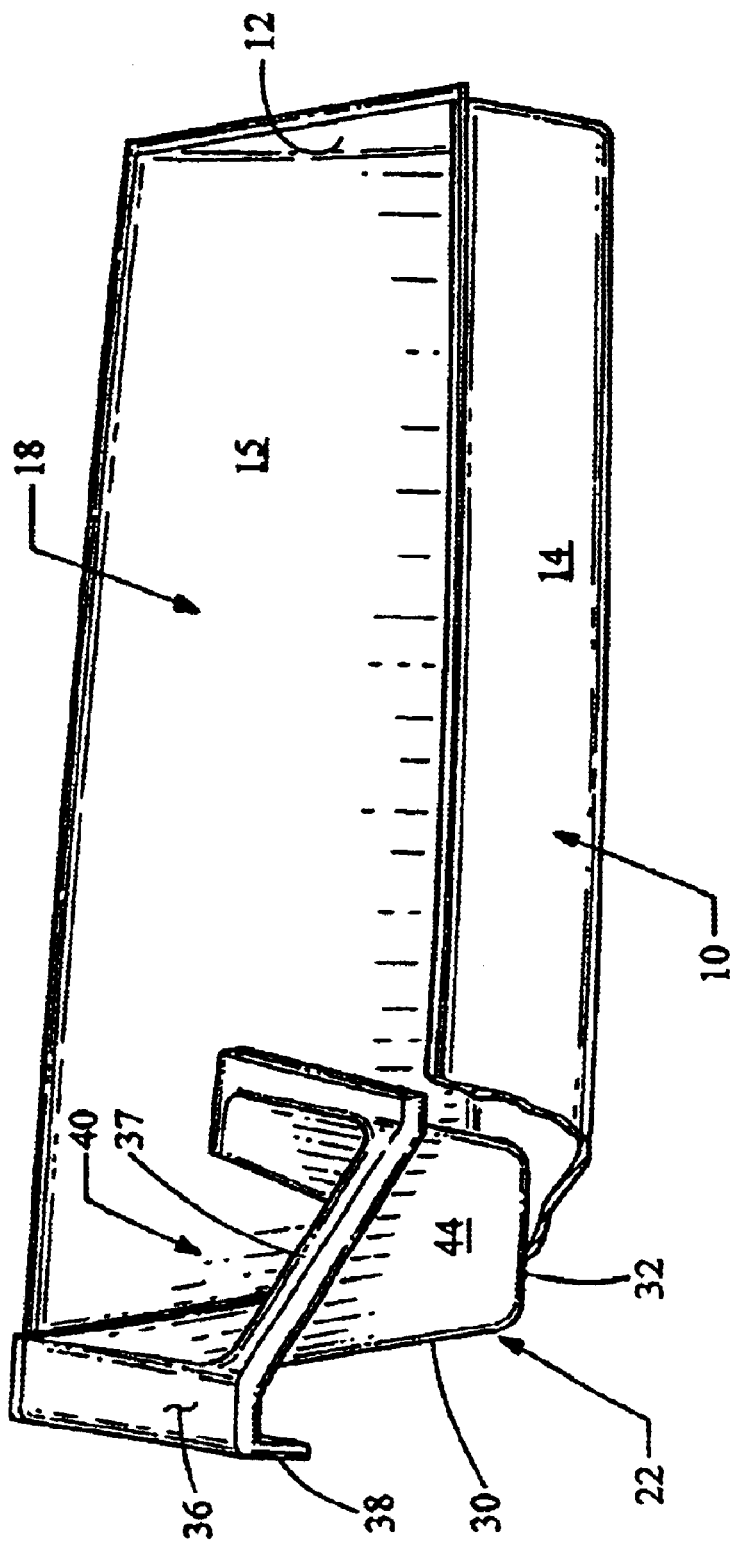
FIG. 3 is a detail perspective view of a modified door pocket and storage receptacle according to a second embodiment hereof, taken from a vantage point at the side of the receptacle, with part of the pocket cut away.
Figure 4:
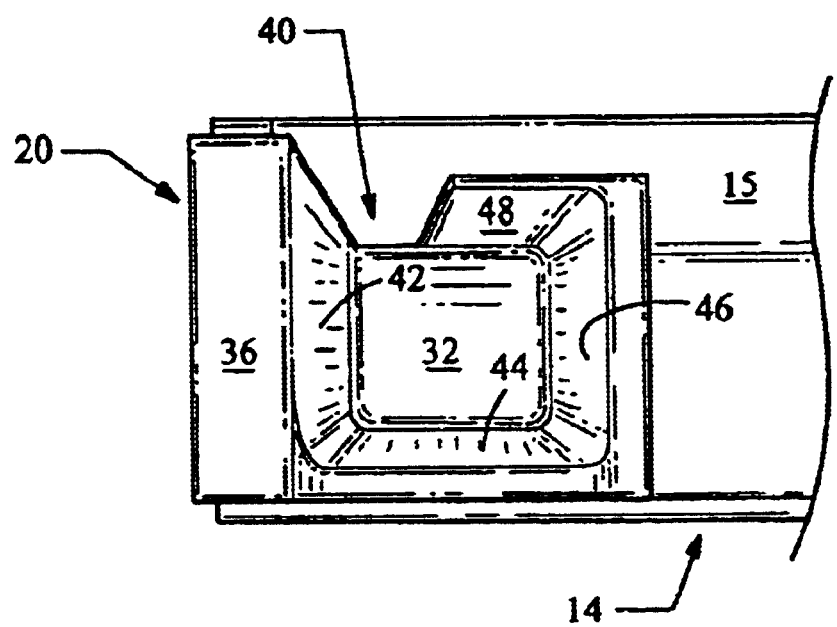
FIG. 4 is a detail perspective view of the door pocket and receptacle of FIG. 3, from a vantage point above and looking down into the receptacle, and with part of the pocket cut away.

The gap 40 may be formed in the inboard side or in the outboard side of the receptacle case 22. In the embodiment of FIGS. 3–5, the gap 40 is formed in the outboard side, between the first and fourth side wall portions 42, 48.

The receptacle case 22 may be configured to taper inwardly from the top towards the bottom thereof, as shown, to make it easy to remove glasses therefrom. In one embodiment, a top edge portion 37 of the receptacle case may ramp downwardly on one side 44 thereof, to ensure that the storage space 34 therein is disposed substantially entirely inside the storage area 18 of the door pocket DP, and to help protect contents of the receptacle 20.

The fourth side wall portion 48 may be spaced inwardly in relation to the outboard edge of the first side wall portion 42.

As noted above, a storage receptacle 20 according to the primary embodiment of the present invention is adapted to receive and store glasses G therein, such as eyeglasses or sunglasses. The storage receptacle may include a liner inside of the receptacle case, to protect glasses which may be stored therein.

The liner 24, where used, may include one or more materials selected from the group consisting of elastomeric foam, cloth, fiber batting, and flocking. In the embodiment shown in FIG. 5, the liner 24 includes an intermediate cushion layer 26 and an inner cloth layer 28, attached to the cushion layer 26. The cushion layer 26, where used, may include elastomeric foam and/or fiber batting.

Figure 6:
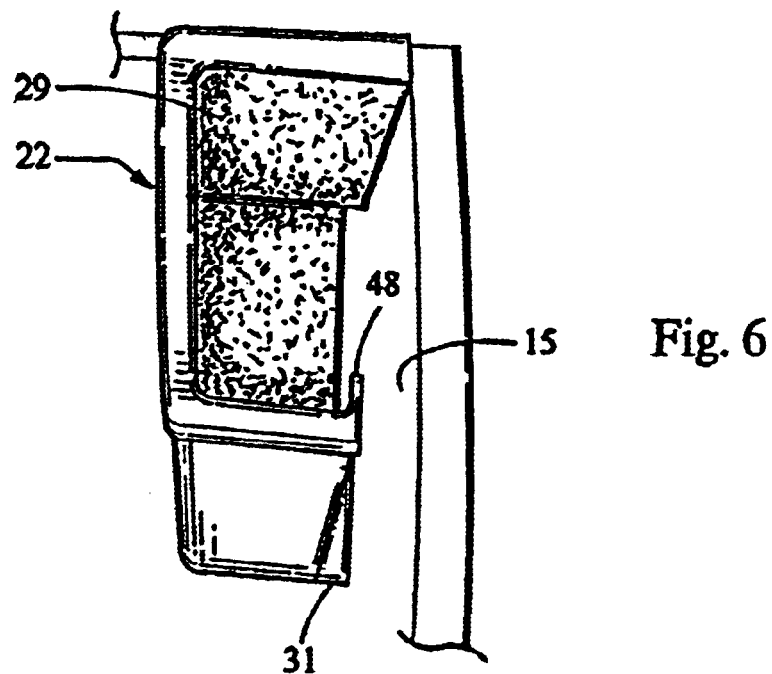
FIG. 6 is a perspective view of a storage receptacle according to a third embodiment hereof.

FIG. 6 illustrates an embodiment in which the receptacle case 22 has flocking 29 therein, attached to the inwardly-facing surfaces thereof. Also in the embodiment of FIG. 6, the receptacle case 22 includes an extension 31 for spacing the fourth side wall portion 48 inwardly from the wall 15 of the door pocket 10.

Figure 7:
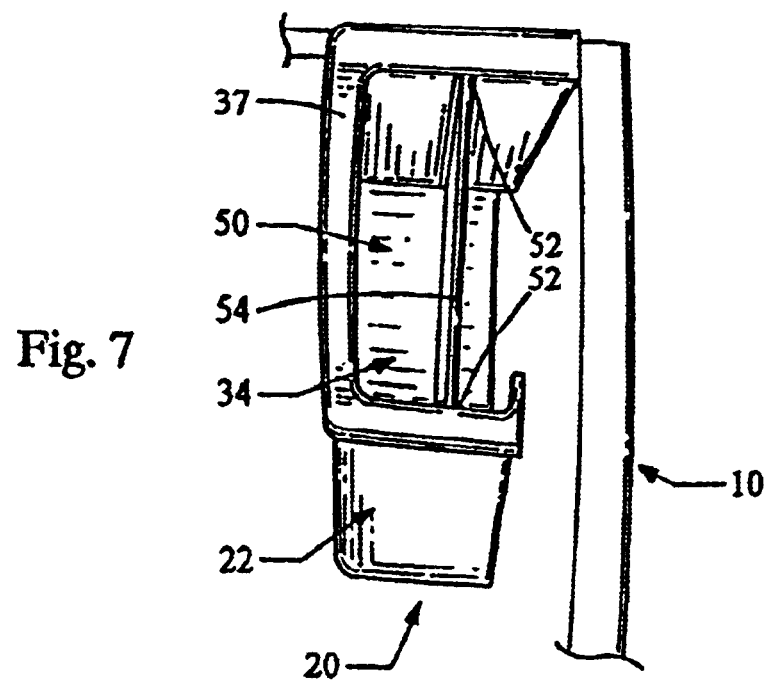
FIG. 7 is a perspective view of a storage receptacle according to a fourth embodiment hereof.

Optionally, and as shown in FIG. 7, the storage receptacle 20 may include a partition 50 for placement in the receptacle case 22 to subdivide the storage space 34 therein. In the embodiment of FIG. 7, the partition 50 includes a pair of grooved support strips 52 and a panel 54 which fits between the support strips.

Figure 8:
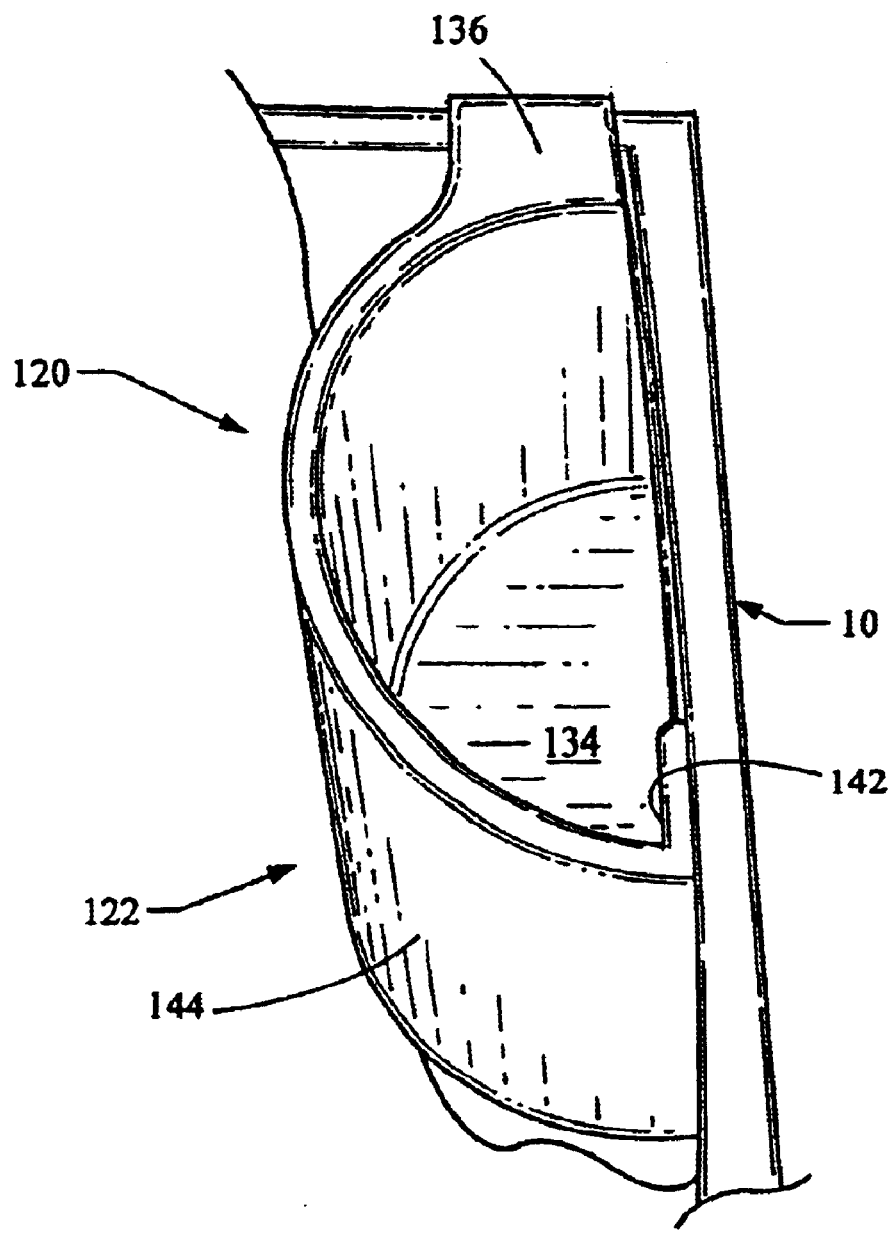
FIG. 8 is a perspective view of a storage receptacle according to a fifth embodiment hereof, also showing part of a door pocket.

Referring now to FIG. 8, in another embodiment hereof, a storage receptacle 120 is provided in a different shape from the storage receptacle 20 according to the first embodiment. In the embodiment of FIG. 8, the receptacle case 122 includes two integrally attached side wall portions. A first side wall portion 142 is substantially flat and has a gap formed therein, and a second side wall portion 144 is semi-cylindrical in shape, so that the case has an outline shape resembling a half-moon. A floor 134 is integrally attached to the lower edges of the respective side wall portions 142, 144. A lip 136 extends outwardly from a portion of the second side wall portion 144, for covering placement on a top section of the door pocket 10.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A storage receptacle for use with a pocket on a vehicle door, said storage receptacle comprising a receptacle case comprising:

at least one side wall;

a floor formed integrally with said side wall and cooperating therewith to define a storage space within said receptacle case; and a lip extending substantially horizontally outwardly from a top portion of said side wall, said lip provided for place ent over an upper edge portion of said vehicle door pocket;

wherein said side wall has a gap formed therein, extending downwardly from said top portion thereof.

2. The storage receptacle of claim 1, wherein a vertical wall of the vehicle door pocket cooperates with said receptacle case to define an edge portion of said storage space when said receptacle is installed therein.

3. The storage receptacle of claim 1, further comprising a partition for placement in said receptacle case to subdivide said storage space.

4. The storage receptacle of claim 1, wherein said receptacle case is dimensioned to use less than half the space of said vehicle door pocket.

5. The storage receptacle of claim 1, wherein said receptacle case comprises at least two integrally attached side walls.

6. The storage receptacle of claim 5, wherein one of said side walls is semi-cylindrical in shape.

7. The storage receptacle of claim 1, wherein said receptacle case comprises at least three integrally attached side walls.

8. The storage receptacle of claim 1, wherein the top edge of said receptacle case ramps downwardly on at least one side thereof.

9. The storage receptacle of claim 1, wherein said receptacle case tapers inwardly from the top towards the bottom thereof.

10. The storage receptacle of claim 1, wherein said receptacle case comprises four integrally attached side walls, comprising a first side wall having an edge, a second side wall attached to said first side wall and extending substantially transverse thereto, a third side wall attached to said second side wall and extending substantially transverse thereto, and a fourth side wall attached to said third side wall and extending substantially transverse thereto, wherein said gap is formed between said first and fourth side walls.

11. A storage receptacle for use with a pocket on a vehicle door, said storage receptacle comprising a receptacle case comprising:

at least one side wall;

a floor formed integrally with said side wall and cooperating therewith to define a storage space within said receptacle case; and a lip extending substantially horizontally outwardly from a top portion of said side wall, said lip provided for placement over an upper edge portion of said vehicle door pocket; and a dependent flange integrally formed with and extending downwardly from said lip;

wherein said side wall has a gap formed therein, extending downwardly from said top portion thereof.

12. The storage receptacle of claim 11, further comprising a liner disposed within said receptacle case to protect contents thereof.

13. The storage receptacle of claim 12, wherein said liner comprises at least one material selected from the group consisting of padding material, foam, cloth, and flocking.

14. The storage receptacle of claim 12, wherein said side wall of said receptacle case comprises four integrally attached side wall portions, comprising a first side wall portion having a back edge, a second side wall portion attached to said first side wall portion and extending substantially transverse thereto, a third side wall portion attached to said second side wall portion and extending substantially transverse thereto, and a fourth side wall portion attached to said third side wall portion and extending substantially transverse thereto, wherein said gap is formed between said first and fourth side wall portions.

15. A storage receptacle for use with a pocket on a vehicle door, said storage receptacle comprising a receptacle case comprising:

at least one side wall;

a floor formed integrally with said side wall and cooperating therewith to define a storage space within said receptacle case; and a lip extending substantially horizontally outwardly from a top portion of said side wall, said lip provided for placement over an upper edge portion of said vehicle door pocket;

wherein said side wall has a gap formed therein, extending downwardly from said top portion thereof and wherein said receptacle case comprises a dependent flange integrally formed with and extending downwardly from said lip.

16. A storage receptacle for use with a pocket on a vehicle door, said storage receptacle comprising a receptacle case comprising:

at least one side wall;

a floor formed integrally with said side wall and cooperating therewith to define a storage space within said receptacle case; and a lip extending substantially horizontally outwardly from a top portion of said side wall, said lip provided for placement over an upper edge portion of said vehicle door pocket; wherein said side wall has a gap formed therein, extending downwardly from said top portion thereof and wherein said gap extends from said top portion of said side wall to said floor.

17. A storage receptacle for use with a pocket on a vehicle door, said stage receptacle comprising a receptacle case comprising:

at least one side wall;

a floor formed integrally with said side wall and cooperating therewith to define a storage space within said receptacle case; and a lip extending substantially horizontally outwardly from a top portion of said side wall, said lip provided for placement over an upper edge portion of said vehicle door pocket;

wherein said side wall has a gap formed therein, extending downwardly from said top portion thereof, and wherein the receptacle case further comprises a liner disposed within said receptacle case to protect contents thereof.

18. The storage receptacle of claim 17, wherein the liner comprises at least one material selected from the group consisting of padding material, foam, cloth, and flocking.

19. A storage receptacle for use with a pocket on a vehicle door, said storage receptacle comprising a receptacle case comprising:

at least one side wall;

a floor formed integrally with said side wall and cooperating therewith to define a storage space within said receptacle case; and a lip extending substantial ly horizontally outwardly from a top portion of said side wall, said lip provided for placement over an upper edge portion of said vehicle door pocket; wherein said side wall has a gap formed therein, extending downwardly from said top portion thereof, and wherein said receptacle case comprises four integrally attached side walls, comprising a first side wall having an edge, a second side wall attached to said first side wall and extending substantially transverse thereto, a third side wall attached to said second side wall and extending substantially transverse thereto, and a fourth side wall attached to said third side wall and extending substantially transverse thereto, wherein said gap is formed between said first and fourth side walls, and wherein said fourth side wall is spaced inwardly in relation to said back edge of said fit side wall.

\* \* \* \* \*

UNITED STATES PATENT AND TRADEMARK OFFICE
CERTIFICATE OF CORRECTION

PATENT NO. : 6,880,874 B1
APPLICATION NO. : 10/698544
DATED : April 19, 2005
INVENTOR(S) : Kris Kallenberger et al.

It is certified that error appears in the above-identified patent and that said Letters Patent is hereby corrected as shown below:

Title Page:
   Item "(56)   References Cited", further under "U.S. PATENT DOCUMENTS", change "1,649,435 A   *   11/1927   Wood et al. ……….. 296/37.9" to --1,649,435 A   *   11/1927   Woods et al. ………….. 296/37.9--.

Column 1:
   Line 25, change "the sane area." to --the same area.--.

Column 5:
   Line 22, change "place ent over" to --placement over--.

Column 6:
   Line 66, change "said stage receptacle" to --said storage receptacle--.

Column 8:
   Line 1, change "substantial ly" to --substantially--.
   Line 21, change "said fit side" to --said first side--.

Signed and Sealed this

Fifteenth Day of January, 2008

JON W. DUDAS
*Director of the United States Patent and Trademark Office*